July 17, 1934.   L. N. CRICHTON ET AL   1,967,201
IMPEDANCE ELEMENT FOR PROTECTIVE RELAY SYSTEMS
Original Filed March 20, 1930
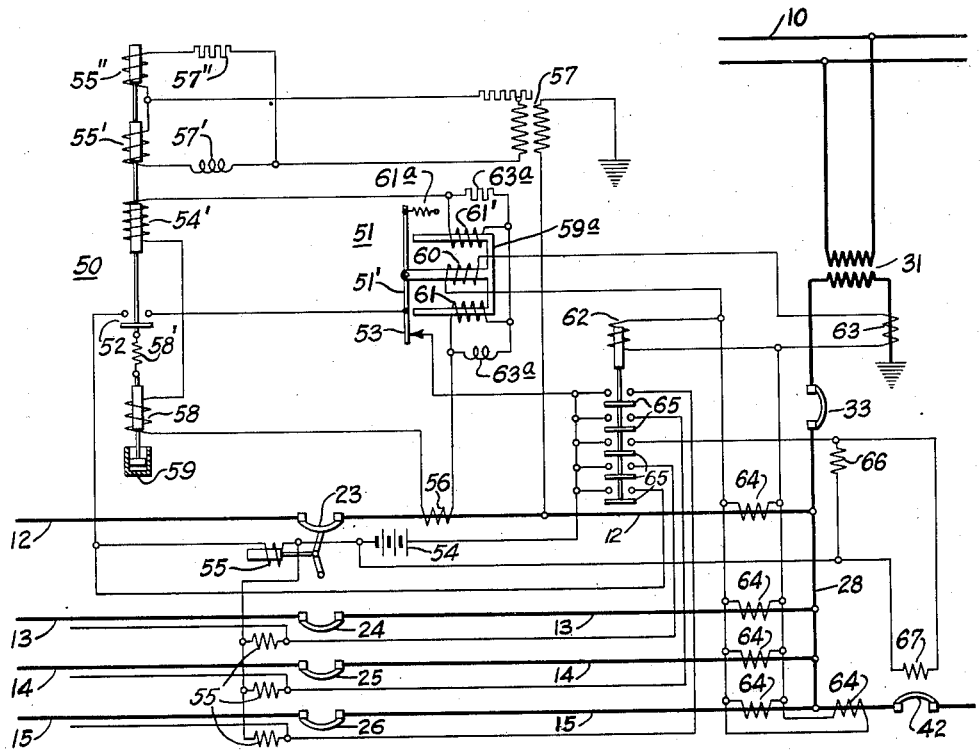
WITNESSES:
INVENTORS
Leslie N. Crichton and
Herbert C. Graves Jr.
BY
ATTORNEY Patented July 17, 1934

1,967,201

UNITED STATES PATENT OFFICE 1,967,201

IMPEDANCE ELEMENT FOR PROTECTIVE RELAY SYSTEMS

Leslie N. Crichton, Livingston, N. J., and Herbert C. Graves, Jr., Upper Darby, Pa., assignors to Westinghouse Electric and Manufacturing Company, a corporation of Pennsylvania Original application March 20, 1930, Serial No. 437,924. Divided and this application October 6, 1933, Serial No. 692,472

7 Claims. (Cl. 175—294)

This application is a division of our parent-application Serial No. 437,924, filed March 20, 1930 for Protective relay systems, which parent-application was a substitute for, and a continuation-in-part of, our application Serial No. 393,433, filed September 18, 1929.

Our invention concerns protective systems for electric-distribution circuits and, more particularly, protective systems for electric-railway power circuits.

The principal objects of our invention are to effect the prompt isolation of any trolley feeder of an electric-railway distribution circuit on which a fault occurs and, at the same time, to maintain service on all other portions of the circuit.

Another object of our invention is to provide means for obviating the effect of load currents on the operation of the protective relays.

A more specific object of our present invention is to provide an improved impedance element for a protective relay system such as that referred to above.

With the foregoing and other objects in view, our invention consists in the apparatus and combinations hereinafter described and claimed, and illustrated in the accompanying drawing, the single figure of which is a diagrammatic view of circuits and apparatus embodying our invention.

The usual alternating-current electric-distribution system for railway service comprises a high-voltage transmission line, such as that shown at 10. Energy is supplied to the motive equipment of the railway from trolley conductors or contact lines 12, 13, 14 and 15. The contact lines are adapted to be sectionalized by circuit breakers located at convenient stations along the line of the railway, such as 23, 24, 25, 26.

When the circuit breakers 23 to 26 are closed, the conductors 12 to 15 will be connected to the bus 28 which is connected to an energy-supplying electrical translating device, such as one terminal of the secondary winding of a step-down transformer, as shown at 31, through a circuit breaker which is indicated schematically, together with its relay control equipment, at 33. The other terminal of the secondary winding of the step-down transformer is adapted to be grounded. The primary windings of the transformers are connected to the high-voltage transmission line 10. The circuit breaker 42 is adapted to connect the bus 28 to another bus (not shown) at the same substation.

In a system such as that described hereinabove, it is requisite that faults occurring on trolley conductors or, for that matter, on the substation buses, shall be isolated with the utmost possible dispatch. Such operation is necessary in order to avoid interference with communication circuits in the neighborhood of the railway. It is equally important, furthermore, that sound conductors remain connected to their source of energy, even at times of fault on other conductors, in order to avoid unnecessary interruptions in service. It is desirable, therefore, that a protective system for a railway distribution circuit be characterized by high speed in operation and the utmost selectivity possible, and, at the same time be dependent upon load conditions and upon the capacity of the connected generators, which are commonly added to the system and disconnected therefrom with the coming and passing of peak-load conditions of the railway system, so that the maximum load current of the peak-load conditions may be more than many fault-currents obtained during off-peak conditions.

It is the general object of our invention to provide a protective system having such characteristics and, in addition, to provide protection against the occurrence of a fault of any possible type.

The protective apparatus of our invention includes a high-speed or "instantaneous" impedance-responsive or fault-distance-responsive relay 50 and a high-speed or "instantaneous" directional relay 51 which have their contacts 52 and 53 connected in series with a circuit including a source of energy, such as the battery 54, and the trip coil 55 of the circuit breaker 23. The impedance relay 50 is an improvement upon the impedance relay described in the patent to Crichton, No. 1,292,584 and comprises an actuating winding 54', which is adapted to be energized in accordance with the current traversing the conductor 12 to be isolated, and two restraining windings 55' and 55" adapted to be energized in accordance with the voltage on said conductor. The current and voltage windings 54' and 55', 55" are energized, respectively, from the current and potential transformers 56 and 57 associated with the conductor 12 and bus 28.

The voltage windings 55' and 55" are made in two parts with separate armatures, and with dephasing means such as a choke coil 57' in series with the winding 55' and a resistor 57" in series with the other winding 55", in order to increase the number or frequency of the force-pulsations on the relay 50, and also to reduce the magnitude of each impulse thus reducing the tendency toward chattering, which is a serious difficulty in the design of impedance relays when they are made "instantaneous", by which we mean that their average time of operation is within from ½ cycle to ¾ cycle, or within 1 cycle on a 60-cycle system, or even less time, from the instant when the relay setting is exceeded.

In addition to the current and voltage windings, the impedance relay 50 is also provided with a load-presetting device comprising the winding 58 connected in series with the current winding 54'. The armature associated with the winding 58 is resiliently secured to the contact 52 of the relay 50 by means of a spring 58', for example, so that, when the winding 58 is energized, an additional restraining force is applied to the contact of the relay 50, requiring a stronger energization of the current-responsive actuating winding or a weaker energization of the voltage-responsive restraining winding to cause the closing of the contact 52 of the impedance relay. A time-delay device, such as a dash pot 59, prevents the load-presetting device from responding immediately to changes in the current flowing in the trolley line 12.

The instantaneous directional or reverse-energy relay is shown at 51 and comprises an E-shaped magnetic circuit or yoke 59a and a cooperating, centrally pivoted, contact-bearing armature 51'. The directional windings 61 and 61' of the reverse-energy relay 51 are disposed on the outer legs of the yoke 59a and are energized from the current transformer 56 in the trolley-line 12, the windings 61 and 61' being oppositely connected, so that one makes a north pole while the other makes a south pole at substantially the same instant.

The polarizing winding 60, which affords a basis for comparison to enable the reverse-energy relay to discriminate between the energy-flow in the trolley-line 12 in the direction away from the bus 28, and in the reverse direction, is disposed on the inner leg of the yoke 59a and is connected, according to the embodiment of our invention shown in the drawing, to be energized from a current-transformer 63 in the supply-circuit of the bus 28, which is preferable to its being energized from the potential transformer 57, as we at first connected it. The reason for this is that a severe fault will so pull down the voltage that the polarizing or discrimatory effect of the voltage coil of the reverse-energy relay, as formerly connected by us, would sometimes be masked by the over-powering strength of the current-responsive directional coils 61 at times of faults, whereas our present bus-supply current-responsive polarizing coil 60 affords a strong polarizing current at the times when such current is needed, giving the quick positive operation which must be obtained if the polarized relay is to be effective to open its contacts 53 and thus prevent the tripping of the line circuit breaker of any line-section in which the fault-current flows toward the adjacent bus, when the normal power current is away from the bus.

The bus-supply current-transformer 63 is placed in the grounded neutral secondary terminal circuit of the transformer 31, rather than on the high-potential or bus-terminal of the transformer secondary winding, so as to avoid the necessity for a high-voltage current transformer. Connections are so made to the windings 60, 61 and 61' of the reverse-energy relay 51 that, as long as energy flows from the sectionalizing substation bus 28, or the relaying point, toward the trolley conductor 12, which is the normal direction of energy flow, the relay 51 will tend to close its contact 53. This follows from the substantially in-phase relation between the fluxes produced by the currents traversing the bus 28 and the circuit 12, by which we mean that the directional winding 61 which is nearer the contact 53 makes a south pole at substantially the same half-cycle that the polarizing winding 60 makes a north pole. Under these conditions, however, the closing of the contact 53 is ineffective so long as the impedance-relay contact 52 remains open. When the direction of energy flow is from the trolley conductors towards the bus 28, the phase relations of the voltage and current will be altered, and the fluxes produced by the windings 60 and 61 of the relay 51 will prevent the closing of its contact 53, or will "instantaneously" open the contact 53 if it was previously closed; that is, the remote directional winding 61' makes a south pole at substantially the same half-cycle that the polarizing winding 60 makes a north pole.

While the impedance relay 50 and the directional relay 51 are both "instantaneous", as distinguished from prior devices in which the relay at the end of the line-section nearest the fault had to trip its associated circuit-breaker before the more remote relays could discriminate between the sound and faulty line-sections, it will be understood that the directional relay 51 should operate to open its contact 53 substantially as quickly as, or preferably quicker than, the impedance relay operates to close its contact 52, or, in general, within about ½ cycle or even less time. It will be further understood that any necessary anti-chattering device, such as phase-shifting or adjusting shunts 63a, may be used in connection with the reverse-current relay 51, if it is not convenient to make the inertia of the rocking switch-arm or armature 51' sufficient for this purpose.

As shown in the drawing, the rocker-arm 51' of the polarized relay 51 may be provided with a weight or a biasing spring 61a for the purpose of making the opening action of the relay somewhat more rapid than its closing action, in order to enable the polarizing relay 51 to move faster than the impedance relay 50 on proper occasion, as heretofore explained.

In addition to the impedance relay 50 and the reverse-energy relay 51, we also provide a differential current relay 62 which is adapted to be energized by the difference between the current supplied from the transformer 31 to the bus 28 and the sum of the currents in all the other conductors connected to the bus 28. The energization of the relay 62 is effected by suitable bridge connections which receive energy whenever the current flowing in the bus-supply current transformer 63 is not substantially equal to the sum of the current in a plurality of current transformers 64 which are connected in the four trolley conductors 12 to 15 and in the bus-tie circuit of the bus-tie circuit breaker 42. The relay 62 has five contacts 65 which are adapted to control the circuits to the respective tripping coils 55 of the four trolley-line circuit breakers 23 to 26, as well as the tripping coil 66 of the transformer circuit-breaker 33 and the tripping coil 67 of the bus-tie circuit breaker 42, so as to completely isolate the bus 28 in the event of a bus fault.

Having described the apparatus which we utilize for the protection of a railway distribution system of the type described, we shall now explain the method of its operation under different conditions.

The impedance relay 50 has the well-known characteristic of operating when the impedance ratio of voltage to current falls below a predetermined minimum value; and by "impedance" we mean to include either the entire impedance of the line-section or any significant component thereof. The impedance relay 50 constitutes a means for estimating, and responding to, the distance of a fault from the sectionalizing station, because, at times of fault, the impedance of the line itself constitutes practically the entire impedance of the circuit, being almost wholly reactive, as is well known.

The addition of the load-presetting coil 58 to the impedance relay does not affect its impedance-responsive characteristic but changes the setting of the relay in accordance with the value of the current traversing the circuit immediately preceding the fault, instantaneous operation of the pre-setting coil 58 being prevented by the spring and dashpot connection 58', 59. It is characteristic of load currents that they increase to their maximum value with less rapidity than fault currents. In ordinary practice, too, the load current will be built up by small increments as additional units are connected to the load circuit. As the load current thus builds up, usually accompanied by a corresponding increase in the total generator capacity connected to the line, the load-presetting coil is energized more strongly and exerts a greater restraining force on the movable element of the relay 50, which is thereby prevented from operating. In the case of a rapid increase in the current traversing the circuit, however, as at times of fault, the relay 50 will be operated because of the increased energization of its actuating coil 54', since the restraining effect of the presetting element 58 is not immediately effective but requires that a certain time element, introduced by the dash pot 59, elapse before the presetting element becomes effective. It will be understood, however, that our load-presetting attachment is not always needed, and we do not desire to limit ourselves to its use.

It will be apparent, from the foregoing explanation, that the impedance relay 50, with the load presetting device 58, 59, is responsive only to the fault-current increments and, since the normal load current introduces a restraining effect proportional to its magnitude, the operation of the relay 50 is compensated for changes in the magnitude of the load connected to the circuit. Our system is thus freed from a serious disadvantage of earlier systems, namely, that, at times of heavy load, a high-impedance fault may trip the circuit breakers and, at times of light load, a low-impedance fault may not produce sufficient fault current to trip the circuit breakers.

The directional relay 51 operates, in the manner described heretofore, to prevent the tripping of the circuit breakers at all times when energy flows in the direction towards the adjacent sectionalizing bus at the switching station. When a fault occurs near the end of any trolley-conductor 12, 13, 14 or 15, the direction of energy flows from all of the other conductors into that end of the faulty conductor will be toward the adjacent sectionalizing bus at that end, and, by the use of the directional relay 51, this fact is made use of to prevent the tripping of the circuit breakers in the sound conductors.

The differential relay 62 operates when a fault occurs on the substation bus 28, with the result that the current supplied to the bus from the transformer 31 differs from the total current supplied from the bus 28 to the conductors 12 to 15 and to the bus-tie circuit breaker 42. In such circumstances, the relay 62 causes the tripping of the trolley-line circuit-breakers 23 to 26, as well as the tripping of the transformer circuit-breaker 33 and the bus-tie-circuit-breaker 42. In this manner bus faults are isolated promptly, and the circuits normally drawing energy from the faulty bus are fed from the adjoining substation.

A closed condition of both of the relays 50 and 51, of course, indicates a low-impedance fault, and the fact that the fault has occurred on the conductor with which the relays are associated. Under these conditions, the sectionalizing circuit breaker is immediately opened and the faulty line isolated. The impedance relay 50 measures the apparent impedance of the trolley-conductor circuit, automatically making adjustment, by means of the presetting device, for any load current then being supplied. This relay, then, determines the advisability of tripping the breaker from the standpoint of the current fed to the line. The directional relay 51 determines whether the energy supplied to the conductor is in the direction characteristic of a fault, and prevents the tripping of any circuit breaker in a line in which energy is not flowing away from the bus.

While we have particularly described our protective relay system in an application to railway feeder circuits, it will be understood that the invention is applicable to other electric systems of transmission or distribution of power. Since alterations in the system of our invention, as shown and described herein, will, no doubt, occur to others, we do not wish to be limited to the specific embodiment disclosed, except as necessitated by the scope of the claims.

The system of cutting out a line in which a fault occurs, as hereinabove described, constitutes the subject-matter of our parent application Serial No. 437,924, heretofore mentioned. Our directional relay element constitutes the tutes the subject-matter of our parent application Serial No. 692,473, filed simultaneously herewith.

We claim as our invention:

1. An instantaneous alternating-current impedance relay comprising electro-magnet-and-armature means for developing actuating impulses responsive to current, and electro-magnet-and-armature means for developing restraining impulses responsive to voltage, characterized by the fact that one of said means is double, with phase-shifting means associated therewith for producing pulsatory relay-controlling forces out of phase with each other.

2. An instantaneous alternating-current relay comprising a plurality of electro-magnet- and-armature means for developing impulses responsive to the same single-phase quantity, and phase shifting means associated therewith for producing pulsatory relay-controlling forces out of phase with each other.

3. In an impedance relay, the combination of a plurality of electro-magnets, a separate armature for each, a mechanical connection therebetween whereby the total pull is balanced, and relay-contacts carried by said mechanical connection, characterized by one of said electro-magnets being a current winding, others of said electro-magnets being voltage windings, and means for shifting the phase of the currents traversing one of said voltage windings.

4. In an impedance relay, the combination of a plurality of electro-magnets, a separate armature for each, a mechanical connection therebetween whereby the total pull is balanced, and relay-contacts carried by said mechanical connection, characterized by one of said electro-magnets being a current winding, others of said electro-magnets being voltage windings, and means for shifting the phase of the currents traversing one of said voltage windings, said means comprising an impedance connected in series with one of said voltage windings.

5. A quick-acting relay including two electro-magnet means both responding to the same alternating-current quantity for developing two pulsatory relay-operating forces pulling together but out of phase with each other, said means including phase-shifting means associated therewith for accomplishing the stated result, other means for developing a different relay-operating force in opposition to said first two forces, and contact-carrying means the position of which is changed according to which of the opposing forces is the greater.

6. An instantaneous impedance relay comprising voltage-responsive means for providing subdivided dephased separate magnetic flux paths, a dissimilarly energized electromagnetic means energized dissimilarly from said voltage-responsive means, and structural means for opposing the magnetic pulls developed by said first two means.

7. An instantaneous impedance relay comprising voltage-responsive means for producing subdivided dephased separate magnetic flux paths, a current-coil means, and structural means for opposing the magnetic pulls developed by said first two means.

LESLIE N. CRICHTON.
HERBERT C. GRAVES, Jr.